July 6, 1965  F. D. HICKEY ETAL  3,192,974
PEELING APPARATUS
Filed July 2, 1962  3 Sheets-Sheet 3
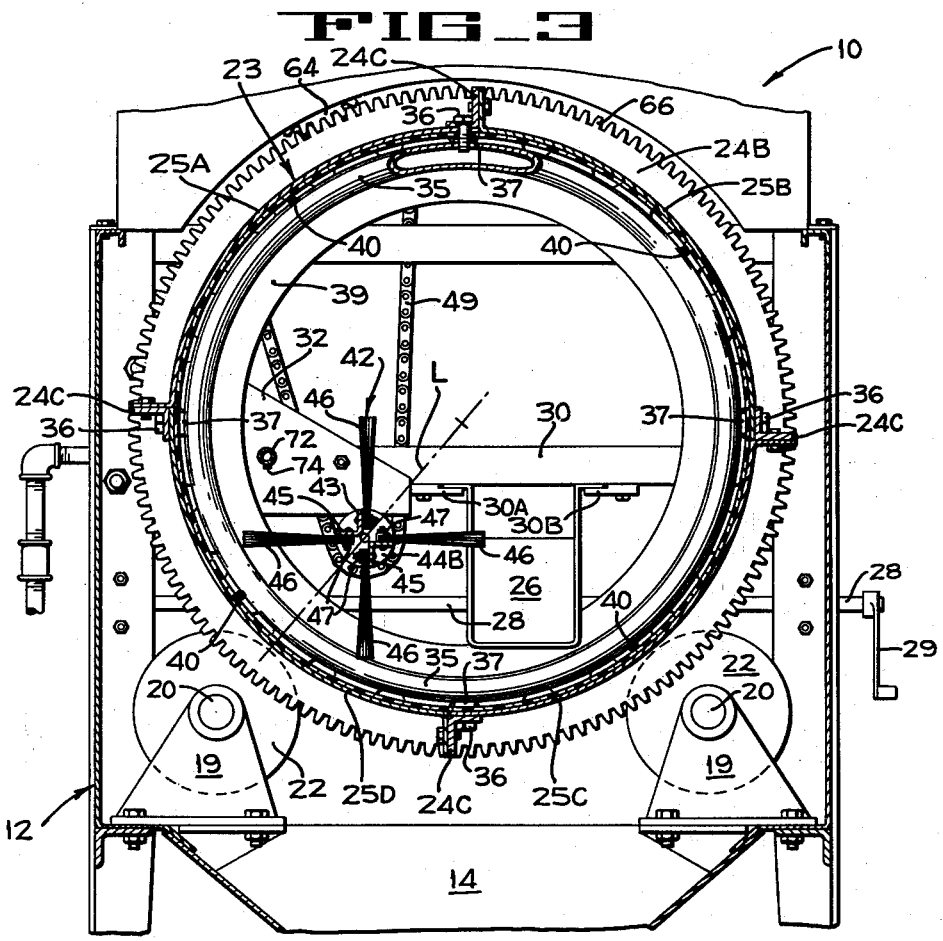
FIG_3
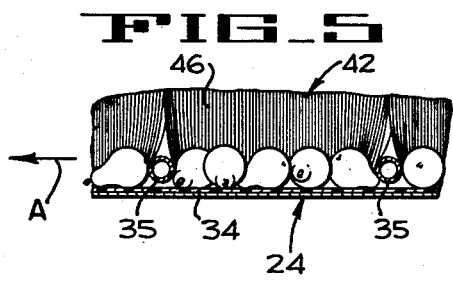
FIG_5
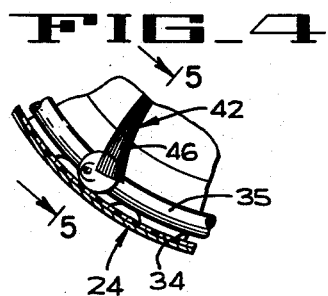
FIG_4
INVENTORS
FRANK D. HICKEY
KATSUJI HIRAHARA
GERALD R. ANDERSON
BY Hans F. Hoffmeister
ATTORNEY United States Patent Office 3,192,974
Patented July 6, 1965

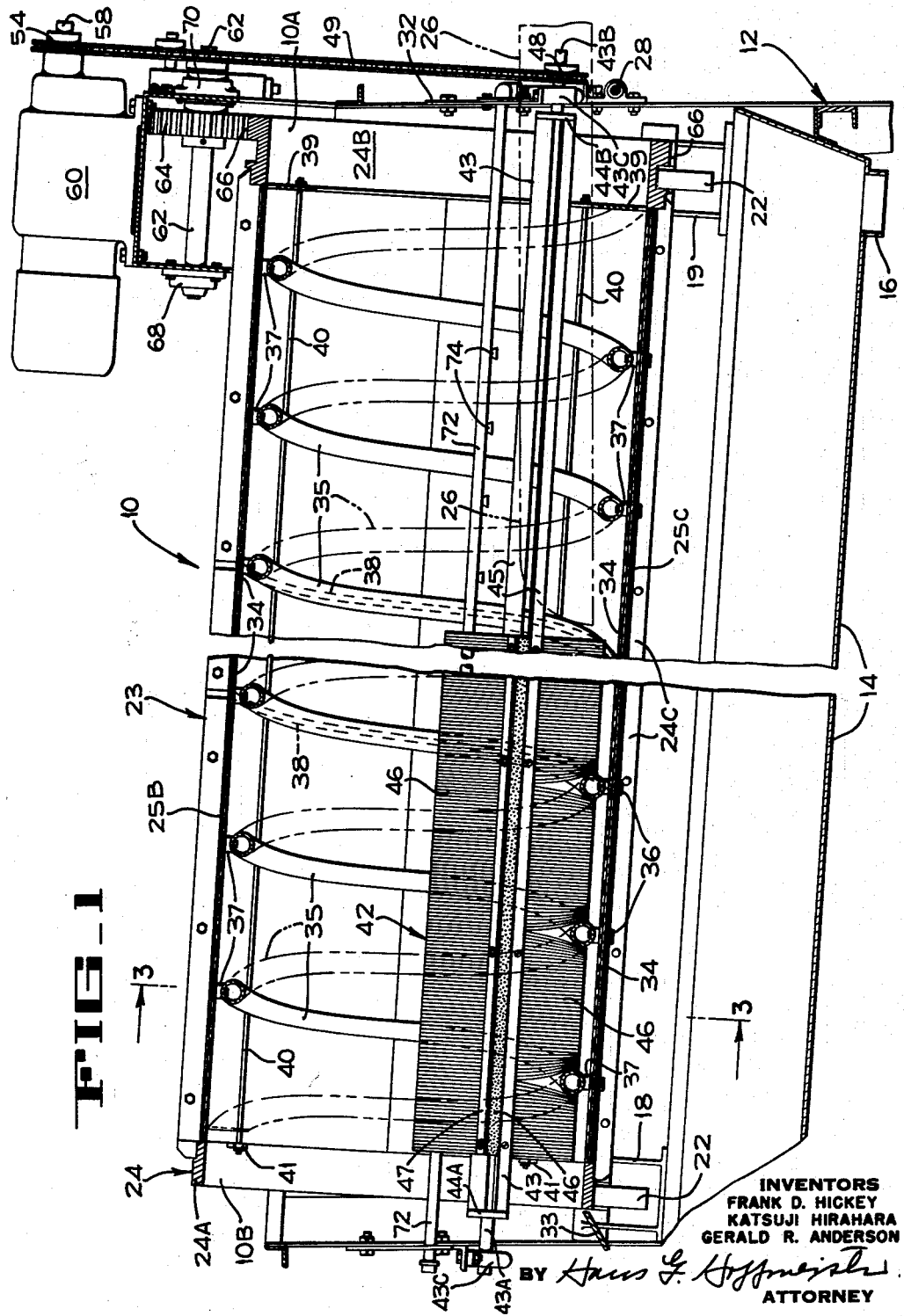

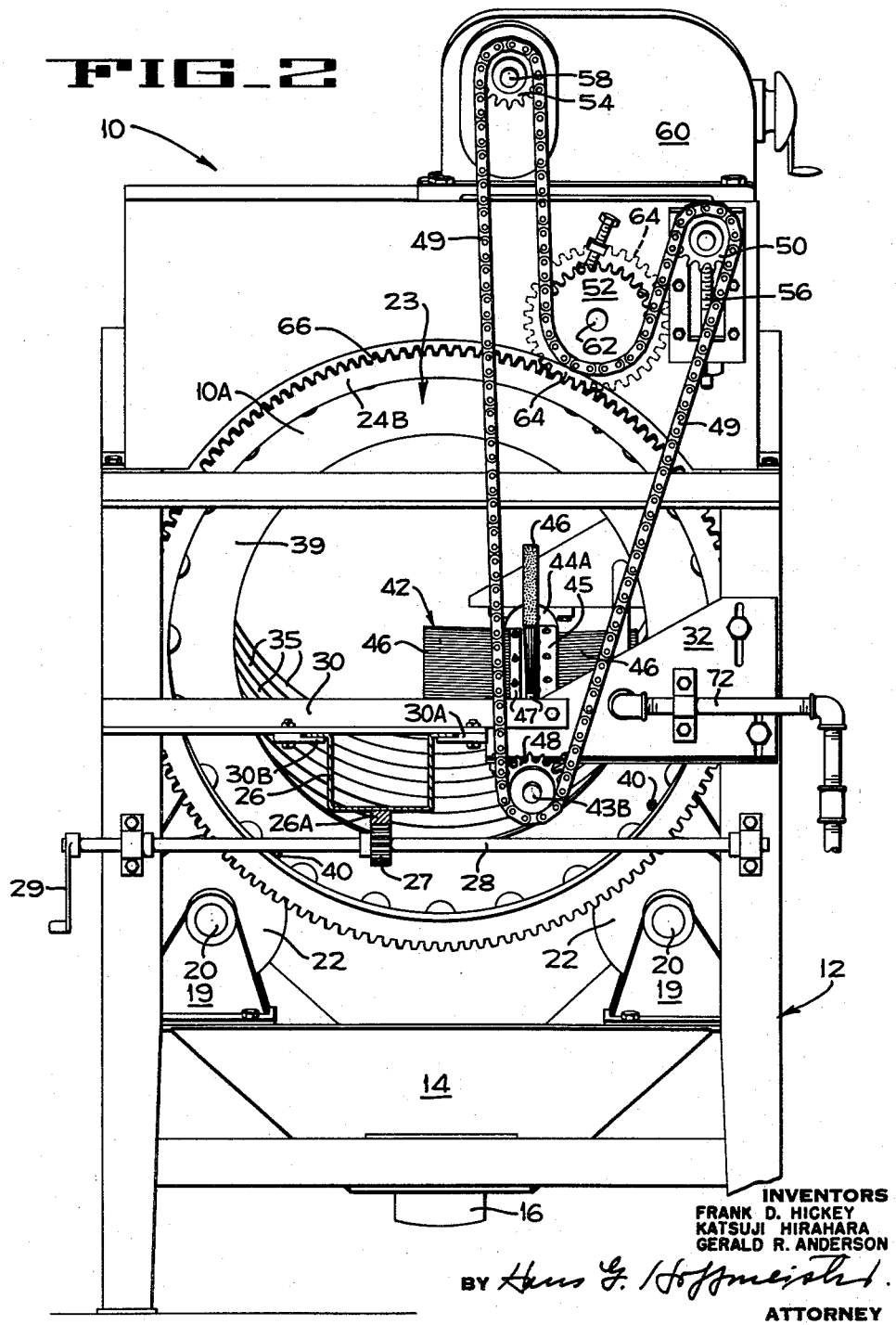

3,192,974
PEELING APPARATUS
Frank D. Hickey and Katsuji Hirahara, San Jose, and Gerald R. Anderson, Campbell, Calif., assignors to FMC Corporation, San Jose, Calif., a corporation of Delaware
Filed July 2, 1962, Ser. No. 206,785
12 Claims. (Cl. 146—50)

This invention relates to peeling apparatus and more particularly to a brush washer for removing the skin of lye treated fruits and vegetables such as pears or the like.

When pears are processed by subjecting them to a lye solution, it is necessary to limit the treatment so as to prevent damage to the cells of the pear underlying the skin. Accordingly, in such a process, the peel of the pear is only partially disintegrated by the lye solution, leaving a certain amount of loose skin and skin tissues on the pear. While a subsequent washing operation will remove a large part of the loose skin, such a washing operation does not produce pears that have the uniform, completely peeled surface that is necessary for commercial acceptance. Accordingly an object of the present invention is to provide an improved apparatus for peeling fruit, such as pears.

Another object of the present invention is to provide an efficient washer that will remove disintegrated skins with a minimum loss of product.

Another object is to provide an apparatus which uniformly washes, brushes, and abrades fruits and vegetables passing progressively therethrough without damage to the product.

Another object is to provide means for the separation and disposal of peelings from the treated fruit and vegetable.

Another object is to provide an improved drum structure for a produce washing unit.

Another object is to provide an efficient, simple brush unit for a washer.

Other objects and advantages of the invention will become apparent from the following detailed description, reference being made to the annexed drawing, in which:

FIG. 1 is a fragmentary longitudinal section of a peeling apparatus embodying the present invention.

FIG. 2 is an enlarged end elevation of the right hand end of the apparatus shown in FIG. 1.

FIG. 3 is an enlarged transverse section taken on the line 3—3 of FIG. 1.

FIG. 4 is a fragmentary diagrammatic section taken transversely of the machine and illustrating the manner in which the bristles of a brush in the peeler contact the surfaces of pears moving through the peeler.

FIG. 5 is a diagrammatic section taken along line 5—5 of FIG. 4 and illustrating the manner in which the brush bristles contact the pear surfaces during movement of the pears on the abrasive liner of a cylindrical drum in the peeler.

In FIG. 1, an embodiment 10 of the peeling apparatus of the present invention is shown which includes a support frame 12 that may be supported above a floor on suitable legs. A drain pan 14, which is fixed to the lower part of the support frame 12, extends longitudinally thereof and is inclined downwardly from the rear fruit-discharging end 10B of the machine toward the forward fruit-receiving end 10A to direct liquid, used in the peeling operation, to a drain pipe 16 located at the lower end of the drain pan. A pair of aligned brackets 18 and 19 are mounted on each side of the support frame 12, the bracket 18 of each pair being disposed adjacent the rear end of the frame, and the bracket 19 of each pair being located at the forward end of the frame. A shaft 20 (FIGS. 2 and 3) is rotatably journalled in each pair of aligned brackets 18 and 19, and each shaft has a roller 22 (FIG. 1) mounted on each end thereof. The four rollers 22 rotatably support a cylindrical drum 23 which is mounted so that the longitudinal axis of the drum is inclined and is parallel to the drain pan 14.

The cylindrical drum consists of a frame 24 made up of end rings 24A and 24B (FIG. 1) connected by four longitudinally extending angle bars 24C (FIGS. 1 and 3). Four curved sheet metal panels 25A–25D are bolted to the frame to form a cylindrical enclosure that is open at both ends. An inclined feed chute or trough 26 extends part way into the lower end of the cylindrical drum 23 to convey the fruit to be peeled into the drum. The chute has a rack 26A (FIG. 2) secured to its undersurface and disposed in engagement with a pinion 27 which is keyed to a shaft 28. A crank 29 is keyed to shaft 28 which is rotatably journalled in vertical members of the frame 12. The chute 26, which has laterally extending flanges at its upper edges, is guided during longitudinal adjusting movement in the drum by brackets 30A and 30B which underlie the flanges of the chute and are secured to a transverse support angle 30 extending between the frame and a brush mounting bracket 32. As seen in FIG. 1, the chute 26 may extend a considerable distance into the drum. Accordingly, the brackets 30A and 30B also extend into the drum a sufficient distance to adequately support the chute in all of its operating positions. If necessary additional brackets may be secured to the angle bar 30 in overlying relation to the side flanges of the chute. While the chute illustrated in FIG. 3 is rectangular in cross-section, a chute having a V-shaped cross-section with a rounded base may be used. A discharge chute 33 (FIG. 1) is provided at the discharge end of the cylindrical drum 23 to receive fruit that is moved over the upper edge of the drum.

The interior surface of cylindrical drum 24 is covered with a liner 34 which may be secured to the drum by any suitable means such as an adhesive or metal clips. The inner surface of the liner should be sufficiently rough or abrasive to rub the skins off of fruit being processed but also must be capable of being readily cleaned after usage. It has been found that a plastic material or a rubber belting material having a relatively hard surface will adequately tumble the fruit to be peeled. Also, as will be explained more fully hereinafter in connection with a discussion of the operation of the washer, neoprene or polyurethane foam is also satisfactory for peeling certain articles such as relatively soft pears.

The fruit is advanced along the drum by a helical coil 35, formed of stainless steel tubing and mounted within the cylindrical drum 23. The coil is held in place in the drum in spaced relation to the inner surface of the liner by bolts 36 which extend through the liner and are threaded into nuts 37 welded to the spiral.

At points intermediate the ends of cylindrical drum 23, helical drain slots 38 are provided in the liner and in the drum directly beneath a revolution of the coil 35. Fragments of skin peeled from the fruit can wash through the slots 38 and pass into the drain pan 14, but articles of fruit will not pass through the slots or become entangled in the slots because of the position of the slots under the coil 35. Four fruit turning rods 40, which are secured to the drum 24 for rotation therewith, extend longitudinally of the drum at spaced intervals around the inner surface. Each rod is connected at one end to a tab 41 (FIG. 1) projecting inwardly from the ring 24A and, at the other end, to a flat annular plate 39 which is welded to the ring 24B. The purpose of the turning rods 40 is to cause articles of fruit to rotate relative to the liner 34 when the turning rod passes beneath the fruit, thus preventing a flat spot from being worn on one side of an article of fruit.

A revolving brush 42 is mounted in the drum, said brush including a frame 43 having stub shafts 43A and 43B at its ends. Each shaft is journalled in a bearing 43C secured to the support frame 12. In addition to the shafts 43A and 43B, the brush 42 includes two circular end plates 44A and 44B (FIG. 1) between which two angle bars 45 (FIG. 3) are welded. Four bristle units 46 are secured to the frame 43, each unit consisting of a cluster of nylon bristles mounted in a channel bracket 47. As seen in FIG. 3, each channel bracket is bolted along its length to one of the flanges of the angle bars 45. It is to be noted that the length of the brush 42 may be changed by replacing the units 46 by units of different length, and this replacement is facilitated by the removable attachment of the units to the angle bars 45. In the arrangement of FIG. 1, the brush 42 is about two-thirds as long as the drum.

The stub shaft 43B has a sprocket wheel 48 (FIG. 1) mounted at the fruit-receiving end 19A of the machine. A drive chain 49 interconnects sprocket wheel 48 with an idler sprocket 50 (FIG. 2), a drum sprocket 52, and a driving sprocket 54. A take-up adjustment unit 56 is provided to adjust the position of the idler sprocket 50. The driving sprocket 54 is mounted on a drive shaft 58 of an electric motor 60.

The sprocket 52 is secured to a shaft 62 on which a gear wheel 64 (FIG. 1) is mounted in meshing engagement with a ring gear 66 formed on the outer surface of end ring 24B of drum 23. Shaft 62 is journalled in bearings 68 and 70, which are mounted on the support frame 12. The drive chain 49 thus rotates the brush 42 and the cylindrical drum 23 in the same direction, which is clockwise in FIG. 3. It has been found that, when brush 42 rotates at about 300 r.p.m. with the cylindrical drum 23 rotating at about 20 r.p.m., a desirable brushing effect for pears is achieved. However, the speed and direction of rotation may be varied to attain the most desirable abrasive effect for the particular fruit or vegetable being processed.

When fruit has been subjected to a preliminary, skin-loosening treatment in a lye bath, the characteristics, such as flexibility, surface texture and length of the bristles of the brush 42, and the position of the brush in the drum play an important part in successfully removing the heat-damaged layer without damaging the underlying flesh. As an indication of what is meant by flexible bristles, actual embodiments perform very satisfactorily when the bristles are made of nylon, are each about 0.011 inch in diameter, and when each bristle is about six inches long from its innermost end to its tip; and when each cluster has a thickness of about ⅜ of an inch at the point where the bristles emerge from their channel bracket 47. As an indication of brush positioning, actual embodiments operate very satisfactorily when the brush axis is disposed at the lower left portion (FIG. 3) of the drum axis and when the minimum spacing between the tips of the bristles in each cluster and the lining is about ¾ of an inch, this spacing being measured, when no pears are in the drum, along a radial line L, when each cluster is directed downward and lies in a plane passing through the axis of the drum.

A conduit 72 (FIG. 1) is mounted on the support frame 12 and extends through the cylindrical drum 23 parallel to the longitudinal axis. A plurality of spray nozzles 74 direct water into the drum to aid in removing the loose skin from the fruit or vegetables being processed.

In operation, lye treated fruits or vegetables are delivered to the skin removing apparatus by the feed chute 26. The chute may be inclined slightly relative to the horizontal to promote the movement of articles into the drum. If the articles are delivered along with a flood of water, inclination of the chute may not be necessary. The distance to which the feed chute 26 extends into cylindrical drum 23 may be varied by the crank 29 so as to regulate the distance the articles will travel while in contact with liner 34. Since the amount of peeling action depends upon the distance the articles travel in the drum, the chute provides means for varying the amount of peeling action applied to the particular type of article being processed. The articles drop from the feed chute 26 onto the liner 34. The rotation of cylindrical drum 23 together with the guiding action of coil 35 causes the articles to be conveyed upwardly along the drum, towards the discharge chute 33. The fact that coil 35 is of circular cross section and has no sharp edges prevents damage to the fruit or vegetable when it is dropped from feed chute 26 and when a large quantity of fruit accumulates within the cylindrical drum.

As the fruit or vegetables are conveyed toward the discharge chute 33, the liner 34, together with revolving brush 42 and the spray from water line 72, tends to remove the loosened skin from the lye treated fruit. The turning rods 40 cause the fruit to rotate so as to receive a uniform brushing.

Also, as the pears are moved lengthwise of the drum, they are moved upwardly along the side wall of the drum and, of course, they fall downwardly after reaching a certain height whereupon they are moved upwardly again. During each fall, the pears drop onto a lower portion of the lining 34 or against succeeding pears which are in frictional engagement with the lining 34. The friction of the lining alone, or in cooperation with the rods 40, tumbles the pears each time they fall. Thus, the pears are tumbled over and over as they travel toward the front end portion of the drum.

During this tumbling movement of the pears, they are engaged by the clusters of bristles in the brush 42. Considering the action of one cluster of bristles on one of the pears, the forward side of the cluster (FIG. 4) with respect to the direction of rotation of the brush, initially engages the outer heat-damaged layer of the pear and wipes thereacross with the bristles flexing rearward from the shaft with respect to the direction of rotation of the brush. Since the bristles are flexible, that is, not stiff and unyielding, the tips do not dig into or gouge the pear in an undesired manner. Instead, the side and tips of the bristles gently wipe across the pear and follow its contour thereby lightly scraping off the very soft, heat-damaged flesh. This scraping action is further increased due to the fact that each bristle of the brush may be crimped so that it has a wavy or undulating configuration along its length. Furthermore, each pear moves lengthwise of the bristles (FIG. 5) as it is being moved lengthwise of the drum in the direction of arrow A by the helical coil 35. Thus, the sides of the bristles also gently scrape the soft flesh from the pear. It will be appreciated that in conforming to the pear contour, the bristles reach irregular surfaces and cavities so as to act on the entire pear periphery. In addition, rubbing of the pears against the lining removes some of the soft flesh. It is to be noted that the lining should have a coefficient of friction high enough to tumble the pears and low enough not to bruise them; closed-cell, neoprene foam serves very well in this regard. The closed-cell structure of the neoprene facilitates cleaning of the lining by preventing undesired entry of fruit particles into the lining and the resultant internal bacterial contamination which would be difficult to clean. However, an opened-cell structure can be used if it is open enough to permit easy cleaning.

The described brushing and rubbing actions are uniquely suited to the task of removing the very soft outer layer without damaging the flesh under said layer, it being well-known that choice mature pears, even without any heat-damage portions, are delicate and can be easily gouged and damaged by even manual finger pressure.

Having thus described our invention, what is claimed as new and on which Letters Patent is desired is:

1. In an apparatus for gently removing soft outer flesh from a fruit without damaging underlying flesh which is still of soft and delicate character although harder than said outer flesh, a drum having an inner surface circumscribing the longitudinal axis of the drum, means mounting the drum in a reclined position for rotation about said axis, means for rotating the drum whereby fruit in the drum is tumbled as a result of frictional engagement of said surface with the fruit, an elongated, generally rectangular cluster of resiliently flexible bristles having base ends held together and outer tips free to move relatively to each other, said cluster having opposite sides, means mounting said cluster so that it extends lengthwise in said drum and so that it can move about an axis substantially parallel to said drum axis, and means for imparting movement to said cluster about said cluster axis for repeatedly bringing a side of the cluster against the tumbling fruit whereupon the bristles flex back from their base ends so that the soft fruit is scraped off by the side of the cluster and the tips of the bristles without damaging contact with said underlying flesh.

2. In an apparatus for removing an outer layer of fruit of predetermined depth without damaging the fruit under said layer, a drum having a central longitudinal axis of rotation, an internal lining of resiliently compressible material circumscribing said axis, and a helical rib positioned radially inwardly of said lining in circumscribing relation to said axis; means mounting said drum in a generally horizontal position and for rotation about said axis so that said lining travels through a tumbling arc located below and laterally of said drum axis whereby fruit in said drum is simultaneously tumbled along said arc by said lining and advanced lengthwise of said drum by said rib; an elongated brush having a longitudinal axis of rotation and a narrow cluster of resiliently flexible bristles projecting radially outwardly from said brush axis, each bristle terminating in a tip and said cluster having opposite sides; means rotatably mounting said brush in said drum with said brush axis substantially parallel to and spaced downwardly and laterally from said drum axis between the drum axis and said tumbling arc; and drive means for imparting rotation to said drum and to said brush about their respective axes so that as said fruit is tumbled said bristles flex thereagainst with their tips trailing whereby there is relative movement between the fruit and the bristles lengthwise of the bristles in order to bring the tips gradually into scraping contact with the fruit and so that as said fruit is advanced lengthwise of said drum, said fruit moves transversely of said bristles along a side of said cluster, said tips and sides of the bristles gently scraping said layer from the fruit.

3. In an apparatus for gently removing soft outer flesh from a fruit without damaging underlying flesh which is still of soft and delicate character although harder than said outer flesh, a drum having an inner surface circumscribing the longitudinal axis of the drum, means mounting the drum in a reclined position for rotation about said axis, means for rotating the drum whereby fruit in the drum is tumbled as a result of frictional engagement of said surface with the fruit, an elongated, generally rectangular cluster of resiliently flexible bristles having base ends held together and outer tips free to move relatively to each other, said cluster having opposite sides, each of the said bristles being undulated longitudinally, means mounting said cluster so that it extends lengthwise in said drum and so it can move about an axis substantially parallel to said drum axis, and means for imparting movement to said cluster about said cluster axis for repeatedly bringing a side of the cluster against the tumbling fruit whereupon the bristles flex back from their base ends so that the soft fruit is scraped off by the side of the cluster and the tips of the bristles without damaging contact with said underlying flesh, the undulations in said bristles effecting gentle scraping of the flesh by said side of the cluster.

4. In an apparatus for gently removing soft outer flesh from a fruit without damaging underlying flesh which is still of soft and delicate character although harder than said outer flesh, a drum having an inner surface circumscribing the longitudinal axis of the drum, means mounting the drum in a reclined position for rotation about said axis, means for rotating the drum whereby fruit in the drum is tumbled as a result of frictional engagement of said surface with the fruit, a brush having a shaft and a plurality of substantially rectangular clusters of resiliently flexible bristles radially outwardly extending from said shaft in circumferentially spaced relation to each other, the bristles in each cluster having base ends which are held together adjacent to said shaft and outer tips which are free to move relatively to each other, each of said clusters having opposite sides, means mounting said shaft so that the brush extends lengthwise in said drum and so that said shaft is journalled for rotation in substantially parallel relation to said drum axis, and means for rotating said shaft thereby successively bringing the side of each cluster against the tumbling fruit whereupon the bristles of each cluster flex back from their base ends so that said soft fruit is scraped off by the side of each cluster and the tips of the bristles without damaging contact with the said underlying fruit.

5. The apparatus of claim 4 wherein the shaft of the brush is positioned below and laterally of the drum axis and wherein the tips of the bristles in each cluster are in closely adjacent spaced relation to the inner surface of the drum when their respective cluster is in a radial plane passing through both said shaft and said drum axis and when said bristles are pointed away from said drum axis and toward said inner surface.

6. Apparatus for removing outer portions of a fruit comprising a cylindrical drum inclined to the horizontal and having a plurality of drain slots therein, an abrasive surface on the interior of said cylindrical drum, a fruit tumbling rod mounted on said drum inwardly of said abrasive surface and extending longitudinally of said drum, a helical fruit advancing rib mounted within said drum and spaced inwardly from said abrasive surface in opposed spaced relation to said drain slots whereby said rib precludes lodging of fruit and fruit particles in said slots, a brush extending through said drum and mounted for rotation therein, means for rotating said drum and brush, and a water conduit extending through said drum having a plurality of spray nozzles directed toward said abrasive surface.

7. In a fruit processing apparatus including a support, a drum rotatably mounted in said supporting having a fruit receiving end and being adapted to act upon fruit delivered thereto through said receiving end, means for delivering fruit to the drum comprising a trough carried by said support for adjustable movement longitudinally of said drum, said trough having a discharge end projecting into said drum through said receiving end thereof, and means for imparting said adjustable movement to said trough thereby to adjust the position of said discharge end axially of said drum.

8. The apparatus of claim 7 wherein said imparting means includes a rack on said trough and a gear in mesh with said rack and rotatably mounted in said support.

9. In a rotatably mounted drum for processing fruit, said drum having a cylindrical internal surface circumscribing a longitudinal axis of rotation for the drum, a helical rib of tubular stock positioned within the drum in circumscribing relation to said axis, a plurality of spacer blocks secured to the rib in longitudinally spaced relation therealong and being positioned between the rib and said internal surface of the drum, each of said blocks having a bore radially related to said axis and providing screw threads circumscribing their respective bore, said drum and rib providing apertures individually registering with the respective bores in the blocks, and bolts having shanks extending through the registering apertures and bores and being in screw-threaded engagement with the threads of the respective blocks, each of said bolts having a head located exteriorly of said drum whereby said rib is dependably connected to said drum in closely adjacent spaced relation to the internal surface thereof, said bolted connection of the rib to the drum being effected externally of the drum.

10. For use in a drum rotatably mounted in a support for processing fruit delivered to the drum, a brush comprising spaced end discs, angle iron members rigidly interconnecting said discs, each of said angle members having a pair of flanges converging toward an apex in adjacent parallel relation to an axis of rotation for the brush, a plurality of clusters of resiliently flexing bristles, each of the said bristles having an inner base end and an outer tip, each of said clusters including an elongated U-shaped bracket providing a pair of side flanges interconnected by a base flange and receiving the base ends of their respective bristles between said side flanges, means retaining said base ends of the bristles in their respective brackets, said clusters being individually associated with the flanges of said angle members and radially projecting outwardly from said axis of rotation with one of the side flanges of each bracket being secured to the adjacent flange of an angle member whereby the outer tips of the bristles of each cluster are free to flex with respect to the base ends in said brackets, and a pair of stub shafts projecting outward from said end discs coaxially of said axis of rotation; and means rotatably mounting said shafts in said support with said brush extended through said drum whereby said brush is mounted for rotation within the drum.

11. The brush of claim 10 wherein each of said brackets is releasably connected to its respective flange for enabling clusters of various lengths to be alternatively used in order to adjust the length of the clusters with respect to the length of the drum.

12. An apparatus for removing the disintegrated skins from lye-treated fruit comprising a rotatable elongated tubular member having an abrasive liner on the interior surface thereof, a rotatable brush supporting member in said tubular member, means for rotating each of said members in the same direction, narrow groups of circumferentially spaced brushes on and located to extend generally radially of the axis of said supporting member and being frictionally engageable with the exterior of the fruit, said brushes and the inner surface of said tubular member defining a fruit brushing region through which the lye-treated fruit pass to effect removal of the disintegrated skins, each of said groups of brushes being operative to sequentially traverse said brushing region and cooperable with the liner of said tubular member to frictionally engage the exterior of the fruit and cause oscillatory movement of the fruit in said region when said tubular member and said brush supporting member are rotating.

References Cited by the Examiner

UNITED STATES PATENTS

| 1,683,968 | 9/28 | Gallison | 17—5 |
| 2,355,405 | 8/44 | Vucassovich | 17—5 |
| 2,407,819 | 9/46 | Dolan. | |
| 2,424,803 | 7/47 | De Back. | |
| 2,851,829 | 9/58 | Martin. | |
| 3,071,801 | 1/63 | Scheiding | 17—6 |

FOREIGN PATENTS 10,668   7/89   Great Britain.

J. SPENCER OVERHOLSER, *Primary Examiner.*

CARL W. ROBINSON, *Examiner.*